United States Patent [19]

Maufe

[11] Patent Number: 4,963,998
[45] Date of Patent: Oct. 16, 1990

[54] APPARATUS FOR MARKING A RECORDED SIGNAL

[75] Inventor: Barry G. Maufe, London, England

[73] Assignee: Thorn EM plc, London, England

[21] Appl. No.: 341,943

[22] Filed: Apr. 20, 1989

[30] Foreign Application Priority Data

Apr. 20, 1988 [GB] United Kingdom ............... 8809347

[51] Int. Cl.$^5$ ............................................. G11B 15/04
[52] U.S. Cl. ..................................... 360/60; 455/109
[58] Field of Search .............. 360/60; 380/4; 332/170; 369/84, 85, 90; 455/109, 47; 341/143

[56] References Cited

U.S. PATENT DOCUMENTS

| | | | |
|---|---|---|---|
| 4,086,634 | 4/1978 | Cook ..................................... | 360/27 |
| 4,100,575 | 7/1978 | Morio et al. ........................ | 360/37.1 |
| 4,528,588 | 7/1985 | Lofberg ................................ | 369/84 |
| 4,578,722 | 3/1986 | Lovgren et al. ..................... | 360/60 |
| 4,581,766 | 4/1986 | Parker ................................. | 455/109 |
| 4,644,422 | 2/1987 | Bedini ................................. | 360/60 |

OTHER PUBLICATIONS

Lathi, "Modern Digital and Analog Comm. Systems," 1983, pp. 234–244.

Primary Examiner—William M. Shoop, Jr.
Assistant Examiner—Marc S. Hoff
Attorney, Agent, or Firm—Fleit, Jacobson, Cohn, Price, Holman & Stern

[57] ABSTRACT

This invention relates to apparatus for marking a recorded signal. The apparatus includes means for generating and storing a marking signal comprising at least two codes which are mutually in phase quadrature. The codes are converted to analogue signal and are used to phase-shift modulate the signal to be recorded, the modulating means performing the function of a single side band modulator on the signal to be recorded.

3 Claims, 1 Drawing Sheet

APPARATUS FOR MARKING A RECORDED SIGNAL

This invention relates to apparatus for marking a recorded signal and in particular, though not exclusively, for marking an audio signal being recorded in a recording medium such as magnetic tape or grooved disc.

A recording such as music, on either disc or magnetic tape, is particularly susceptible to unauthorised copying. Such unauthorised copying is very difficult to detect, and so the application of a coded identification signal to the content of a recorded programme, to thereby establish its source and ownership, is clearly desirable.

It is important however, that the coded identification signal applied to the genuine content of a recording should satisfy certain criteria; namely that it should be inaudible and should not impair the quality of a recording, that it should not be easily erased, and should be distinctive and easily recovered from the total content of the recorded programme.

In many known devices the spectrum, over which the coded information is recorded, is made similar to that of the signal being recorded, so that it is difficult to remove, alter or destroy the coded information without seriously impairing the recorded signal. A coded 'marking' signal is used to modulate the audio signal being recorded and to thereby mark the recording with the said information identifying the owner of the recording.

Such known systems employ a method of modulation known as double sideband modulation, that is for each instantaneous music frequency (or any other available frequency) a band of frequencies is added to the music in a range of, for example 100 to 300 Hz, above and below the instantaneous frequency.

There are, however, a number of disadvantages associated with such "double sideband" modulation: a grating sound is produced which is audible and distinctly different from "noise-like" sounds; the lower sideband is not marked so well by the music as the upper side band; it is not possible to modulate audio signals over the full audio band; and some loss of signal so called "process gain", is experienced due to the phase characteristic of the high pass filter used in the modulation.

It is therefore an object of the present invention to provide apparatus for marking a recorded signal, which apparatus provides improved protection from unauthorised detection and removal of the marking than that provided by known apparatus of this kind.

In accordance with the present invention, there is provided apparatus for marking a recorded signal said apparatus including: means for generating and storing a marking signal comprising at least two codes which are mutually in phase quadrature; means for converting said code from a digital to an analogue signal; and modulating means including phase shift means, the arrangement being such that the said two mutually in-phase quadrature analogue signals, corresponding to the marking codes, can be used to phase-shift modulate the signal to be recorded, the modulating means performing the function of a single sideband modulator on the said signal to be recorded.

The apparatus also preferably includes means for demodulating said modulated signal, means for digitising said demodulated signal, said signal comprising two codes mutually in phase quadrature; and means for correlating said demodulated, digitised sequence with reference sequences stored in the means for generating and storing the marking signal.

Thus the present invention provides single sideband modulation of a signal to be recorded, by a marking signal, the said single sideband modulation being such that it is substantially imperceptible on play-back of the recorded signal and eliminating the above-mentioned disadvantages associated with conventional double sideband modulation.

Preferably, the apparatus for marking the recorded signal includes means for generating a marking signal which signal comprises a sequence of binary element and means for translating each like binary element of said sequence into a randomised sequence of binary elements prior to modulation.

The invention will now be further described by way of example only with reference to the accompanying drawings wherein.

Figure 1:
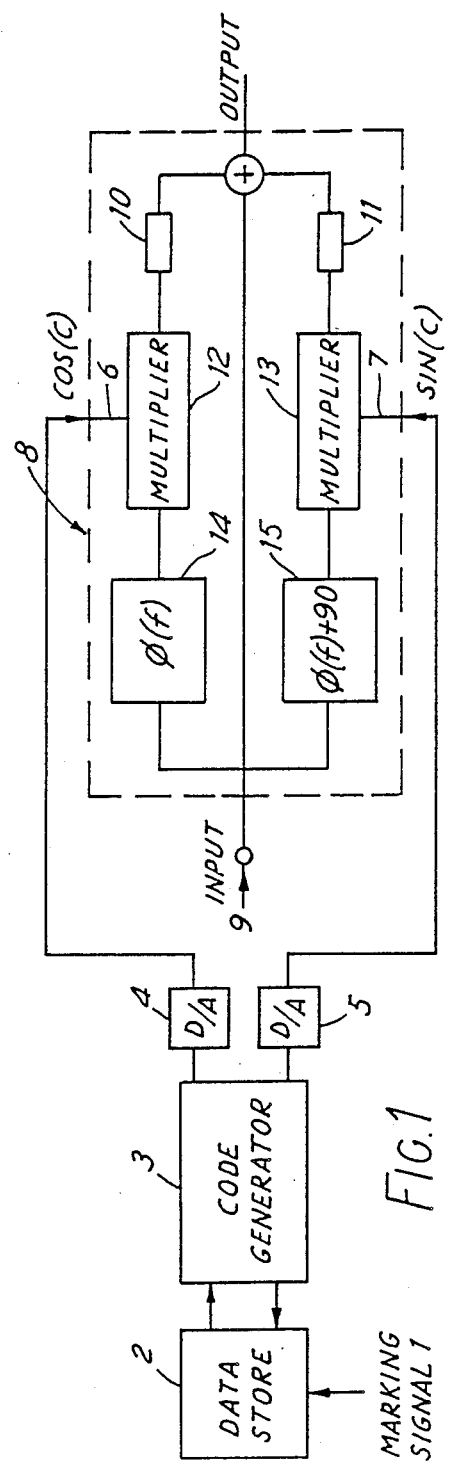
FIG. 1 shows a block circuit diagram of a preferred embodiment of part of the apparatus of the invention.

In FIG. 1 a marking signal 1, indicative of an identification of the owner of a recording, is stored in a data store 2 having been generated by code generator 3. The signal 1 comprises two codes which are mutually in phase quadrature. These codes are output to digital to analogue converters 4 and 5 and become inputs 6 and 7 to a modulator 8. An audio signal 9 is input to the modulator 8 where it is modulated by the marking codes (inputs 6 and 7). The output of the modulator 8 is the audio signal input plus some upper sideband modulation attenuated by attenuators 10 and 11.

The operation of the modulator is simplified by assuming that the audio signal 9 and code inputs 6 and 7 are sinusoidal. This is a valid assumption since the system is linear and time invariant. Modulation is achieved by the phase shift method, which is the only possible way since the carrier signal (audio signal) occupies the same frequency band as the modulation (marking signal).

The modulator operates as follows: input code signals 6 and 7 are sin(c) and cos(c) signals respectively, having been processed by digital to analogue converters 3 and 4, they are also mutually in phase quadrature. Input code signals 6 and 7 are then fed to multipliers 12 and 13 respectively and wide band phase shift networks 14 and 15 respectively. These each give outputs which are initially in phase quadrature from 20 Hz to 20 kHz from a common input. The phase shift networks 14 and 15 introduce a relative phase shift of 90° between input code signals 6 and 7. The audio signal 9 is then sideband modulated by the code signals 6 and 7 after they have undergone wide band phase shift.

The formulae governing the operation of the modulator are as follows:

Input: let music signal be $\sin \omega_m t$,
code inputs, $\sin \omega_c t$, $\cos \omega_c t$
phase shift networks, $\phi(f)$ and $\phi(f) + \pi/2$
Let:

$\omega_m t = m$, $\qquad \omega_c t = c$, $\qquad \phi(m) = \phi$, $\phi(D \cdot C) = 0$, $\quad \phi(c) = \theta$, $\qquad \phi(m + c) = \phi_1$, $\phi(2m) = \phi_2$, $\quad \phi(2m + c) = \phi_3$, $\quad \phi(2m + 2c) = \phi_4$ Modulator.

```
input  = sin m
output = sin m + ½βsin(m + φ) · cos c + ½βcos(m + φ) · sin c
       = sin m + βsin(m + c + φ)
```

Figure 2:
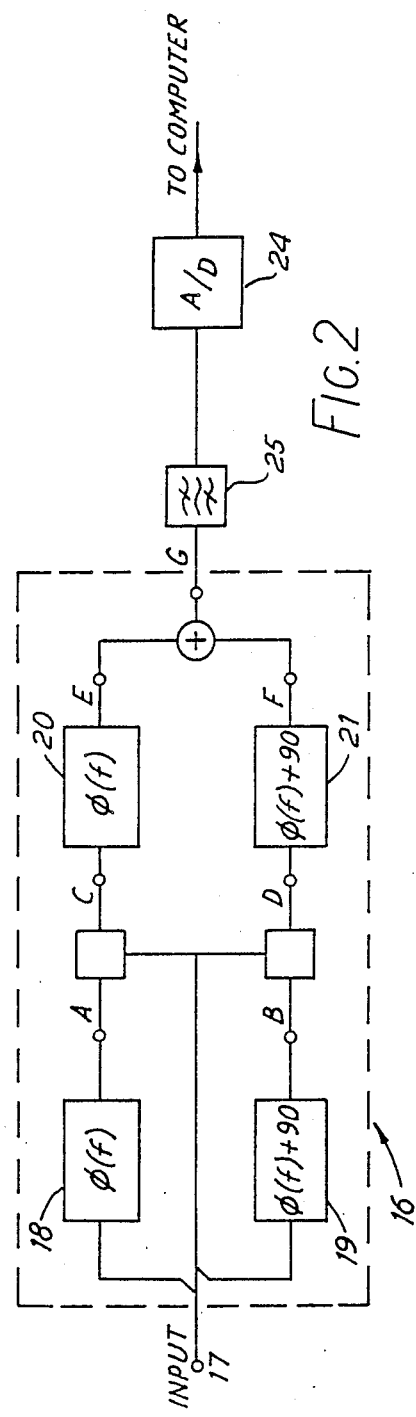
FIG. 2 shows a block circuit diagram of a preferred embodiment of another part of the apparatus of the invention.

FIG. 2 shows a decoder for extracting the marked signal from the audio signal to enable identification of the original owner.

An audio signal from which a marking code is to be extracted is passed to a compression unit (not shown) to reduce the dynamic range of the signal by a factor of at least 2 in order to maximize signal to noise ratio and minimize distortion at the output of a demodulator 16. The output from the compressor is fed to input 17 of the demodulator 16 through wide band phase shifters 18, 19, 20 and 21. Multipliers 22 and 23 effectively double the dynamic range at points C and D. The output is fed to an analogue to digital converter 24 via a band pass filter 25 which reduces noise outside the signal band.

The digitised signal is then fed to a computer (not shown) and correlated with stored reference sequences to extract the information.

In this embodiment of the invention a full 8×8 bit correlation is performed in order to maximise process gain and a hardware correlator (not shown) is linked to the computer to reduce processing time, neither of these is essential for operation of the system, however.

The formulae governing the operation of the demodulator are as follows:

Demodulator.
Points on Diagram $$C = \sin m \sin(m + \phi) + \beta\sin m \sin(m + c + \phi + \phi_1) +$$
$$\beta\sin(m + \phi)\sin(m + c + \phi) +$$
$$\beta^2\sin(m + c + \phi)\sin(m + c + \phi + \phi_1)$$

$$D = [\sin m \cos(m + \phi) + \beta\sin m \cos(m + c + \phi + \phi_1) +$$
$$\beta\cos(m + \phi)\sin(m + c + \phi) +$$
$$\beta^2\sin(m + c + \phi)\cos(m + c + \phi + \phi_1)] =$$
$$\tfrac{1}{2}[\sin(2m + \phi) - \sin\phi + \beta\sin(2m + c + \phi + \phi_1) -$$
$$\beta\sin(c + \phi + \phi_1) + \beta\sin(2m + c + 2\phi) +$$
$$\beta\sin c + \beta^2\sin(2m + 2c + 2\phi + \phi_1) - \beta^2\sin\phi_1]$$

$$E = \tfrac{1}{2}[\cos\phi - \cos(2M + \phi + \phi_2) + \beta\cos(c + \phi + \phi_1 + \theta) -$$
$$\beta\cos(2m + c + \phi + \phi_1 + \phi_3) + \beta\cos(c + \phi) -$$
$$\beta\cos(2m + c + 2\phi + \phi_3) + \beta^2\cos\phi_1 -$$
$$\beta^2\cos(2m + 2c + 2\phi + \phi_1 + \phi_4)]$$

$$F = \tfrac{1}{2}[\sin\theta + \cos(2m + \phi + \phi_2) - \beta\cos(c + \phi + \phi_1 + \theta) +$$
$$\beta\cos(2m + c + \phi + \phi_1 + \phi_3) + \beta\cos(c + \theta) +$$
$$\beta\cos(2m + c + 2\phi + \phi_3) + \beta^2\sin\phi_1 +$$
$$\beta^2\cos(2m + 2c + 2\phi + \phi_1 + \phi_4)]$$

$$G = \beta\cos(c + \theta) + \text{some } D.C. \text{ terms.}$$

Note, θ is not a function of "m".

An example of a marking signal for use with the invention would be one comprising a sequence of binary elements, either "1" or "0". Referring to FIG. 1, the marking signal 1 comprising the sequence of binary elements is stored in date store 2. The binary elements are passed to a code generator 3 which effectively translates each like binary element into a pseudo-random sequence of binary elements, to produce an encoded signal. Respective pseudo-random sequences are used for the two types of binary element, such that a poor correlation between the two pseudo-random sequencies is achieved. Each pseudo-random sequence typically comprises 31 binary elements and the clock rate of the binary elements is determined by an input to the code generator 3 from a code generator (not shown in FIG. 1).

What is claimed is:

1. Apparatus for marking a recorded signal, said apparatus including: means for generating and storing a marking signal comprising at least two codes which are mutually in phase quadrature; means for converting said codes from a digital to an analogue signal; and modulating means including phase shift means such that the two marking codes can be used to phase-shift modulate the signal to be recorded, said modulating means performing the function of a single side band modulator on the said signal to be recorded.

2. Apparatus as claimed in claim 1, said apparatus for marking the recorded signal including:
   means for generating a marking signal, said signal comprising a sequence of binary elements;
   and means for translating each like binary element of said sequence into a randomised sequence of binary elements prior to modulation.

3. Apparatus as claimed in claim 1, said apparatus including: means for demodulating said modulated signal; means for digitising said demodulated signal into a sequence; and means for correlating said demodulated, digitised sequence with reference sequences stored in the means for generating and storing the marking signal.

* * * * *